United States Patent [19]

Rowson

[11] Patent Number: 5,034,055
[45] Date of Patent: Jul. 23, 1991

[54] PROCESS FOR THE ENHANCED PRODUCTION OF SILVER FROM GOLD AND SILVER BEARING ORE

[75] Inventor: John W. Rowson, Saskatoon, Canada
[73] Assignee: Cluff Mining, Saskatchewan, Canada
[21] Appl. No.: 557,640
[22] Filed: Jul. 25, 1990
[51] Int. Cl.$^5$ .............................................. C01G 5/00
[52] U.S. Cl. ................................................... 75/744
[58] Field of Search ....................................... 75/744
[56] References Cited

U.S. PATENT DOCUMENTS 4,816,235  3/1989  Pesic ..................................... 75/744

FOREIGN PATENT DOCUMENTS

| 43524 | 7/1893 | Canada . |
| 44757 | 10/1893 | Canada . |
| 72062 | 1/1901 | Canada . |
| 105087 | 5/1907 | Canada . |
| 127091 | 7/1910 | Canada . |
| 403924 | 4/1942 | Canada . |
| 856166 | 11/1970 | Canada . |
| 994107 | 8/1976 | Canada . |
| 1125033 | 8/1982 | Canada . |
| 1213150 | 10/1986 | Canada . |
| 1232139 | 2/1988 | Canada . |

OTHER PUBLICATIONS

Rowson, J. W., Melis, L. A.: Operation of a Gold Extraction Circuit for Recovery of Gold from Uranium Mill Tailings at Cluff Lake, Saskatchewan; CIM Bulletin, vol. 82, No. 931, pp. 40–46, Nov. 1989.
Fleming, C. A.: Professional Development Carbon-in-Pulp Seminar, 26th Annual Conference of Metallurgists, Winnipeg, Manitoba, Aug. 1987; Canadian Institute of Mining and Metallurgy; vol. I, pp. 49–51.

Primary Examiner—Peter D. Rosenberg
Attorney, Agent, or Firm—Willian Brinks Olds Hofer Gilson & Lione

[57] ABSTRACT

There is disclosed a process for recovering gold and silver values from ore using activated carbon for adsorbing the values, wherein the activated carbon is treated with a suitable oxidant having an oxidation potential higher than that of oxygen. A preferred oxidant is potassium permanganate. Activated carbon so treated has an enhanced affinity for adsorbing silver, even under conditions which traditionally have favored loading of carbon with gold.

9 Claims, 1 Drawing Sheet

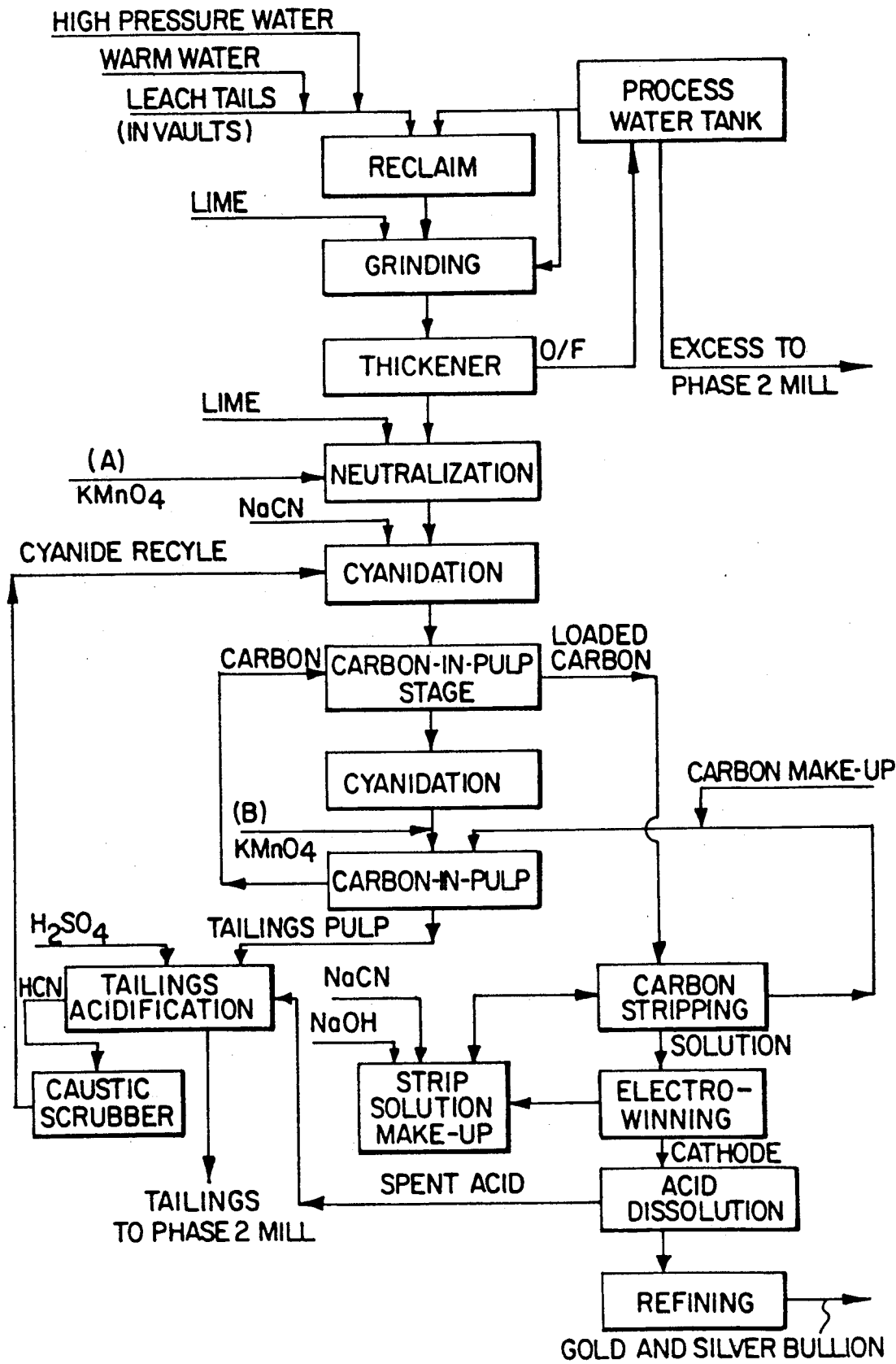

PROCESS FOR THE ENHANCED PRODUCTION OF SILVER FROM GOLD AND SILVER BEARING ORE

The invention relates to a process for producing gold and silver from ore which contains economically significant values of silver. Economically significant values of silver will vary with market conditions, principally the price of silver in the marketplace, the quantity of silver present in the ore and the cost of appropriate chemical reagents. At the time of this application, gold bearing ores containing at least 15 grams/tonne of silver would be most suitable as a starting material for the process of the present invention.

The invention more particularly relates to the above process in which activated carbon is used as an adsorbent for gold and silver from which the gold and silver can then be recovered. In common use today are processes which include cyanidation of gold and silver bearing ore to provide gold and silver in solution followed by adsorption of the gold and silver from solution onto activated carbon particles. Activated carbon, which has an affinity for adsorbing gold and silver, is typically provided in a carbon-in-pulp (CIP) circuit. When activated carbon has been loaded with gold and silver due to adsorption, the gold and silver can be stripped from the carbon using, for example, a caustic and cyanide stripping solution.

It is known that under normal operating conditions gold is adsorbed in preference to silver by activated carbon and will displace silver from the carbon back into solution as loading on the carbon increases. Silver returning into the solution is lost. Gold ores having substantial silver content, e.g. a silver/gold ratio of one or more, show an adsorption recovery of silver much lower than that for gold. In order to increase recovery of silver, carbon can be loaded to well below its capacity so that conditions for the loss, or "squeezing off", of silver are avoided. However, higher flow rates of activated carbon will be required to maintain total production levels near those that can be achieved with heavy loading of the carbon. Greater gold losses and carbon consumption will be realized with higher carbon flow rates due to increased attrition of the carbon which results from the more frequent pumping and handling requirements.

Canadian Patent No. 1,125,033 (Anglo American Corporation of South Africa Ltd.) provides for a solution to the above discussed problem which is essentially to load the activated carbon at a pH of less than 8, preferably about 4-5. At such a pH, it is taught that silver is not displaced from carbon by gold at high carbon loading levels. However, there are serious disadvantages to loading carbon at a relatively low pH, most notably including the cost of acid to reduce the pH to below 8 and the loss of gold leaching activity which often accompanies the adsorption stage. The latter will reduce the yield of gold.

U.S. Pat. No. 4,606,766 (Sherrit Gordon Mines) discloses another method to overcome the above discussed problem. This essentially consists of two carbon-in-pulp circuits, one which loads primarily for gold recovery and the other which loads primarily for enhanced silver recovery. After a series of stages operated for gold loading of carbon from a cyanide leach slurry (which is the feed stream containing gold and silver in solution), i.e. by maximally loading the carbon, the slurry is passed through a series of stages operated primarily for silver loading of carbon. Some of the carbon from the latter stages is bled-off for processing for silver recovery and the remainder of the carbon is passed along to the gold loading stages. The disadvantages of this method include the need for more plant equipment and space for operating the two circuits and separate gold and silver recovery stages.

The present invention provides for a simplified solution to the problem of silver losses at high carbon loading conditions while avoiding the above noted disadvantages of prior art methods. The inventive solution results from the discovery that the addition of an oxidant having a higher oxidation potential than oxygen, to a slurry containing gold and silver in solution that is fed to activated carbon for adsorption, increases the yield of silver significantly over that which would have been expected under high level carbon loading conditions. Oxygen is typically used in cyanidation processes today for the enhancement of extraction of precious metals from ores into solution, so in processes which subsequently recover metals by adsorption onto activated carbon, the carbon is typically exposed to a feed stream having an oxidation potential no greater than that of oxygen. However, it has not heretofore been realized that the affinity of activated carbon for silver could be raised by exposing the carbon to an oxidant having an oxidation potential greater than that of oxygen, for example by adding such an oxidant to a feed stream for contact with the carbon.

The invention provides a process for recovering gold and silver values from ore using activated carbon for adsorbing the values, in which the activated carbon is treated with a suitable oxidant having an oxidation potential higher than that of oxygen.

In another aspect the process comprises treating gold and silver containing ore to provide a solution, preferably alkaline, of gold and silver, adsorbing the gold and silver from the solution onto activated carbon treated with a suitable oxidant having an oxidation potential higher than that of oxygen and recovering gold and silver values from the activated carbon. The oxidant is suitable if it meets the aforementioned condition and satisfy an operator's requirements. Such requirements may be highly variable, may be assessed by routine testing and relate to physical and chemical properties desired in an oxidant (which in turn relate to the chemical composition of ore to be treated and nature of the treatment and adsorption environment, for example), availability, cost, and safety, both to the environment and operator. The solution of gold and silver is preferably a gold and silver cyanide complex solution which also includes the aforementioned oxidant. Oxidants are preferred which raise the oxidation potential of the solution to greater than about +200 mV, preferably greater than +300 mV (as measured relative to the standard hydrogen electrode). A preferred oxidant is potassium permanganate, which further preferably is provided in the solution in a quantity in a range of about 0.01 to 6.0 grams per liter of the solution. The oxidant preferably is added to the solution of gold and silver at a stage when it would react minimally with other constituents of the solution.

In another aspect, the inventive process comprises cyanidation of gold and silver containing ore to provide an alkaline, gold and silver cyanide complex solution, feeding the solution to activated carbon for adsorption of the gold and silver, and recovering adsorbed gold and silver from the activated carbon. The activated carbon is treated with a suitable oxidant having an oxidation potential greater than that of oxygen to increase the yield of silver. The oxidant is a suitable oxidant in the same sense as described above.

In yet another aspect there is provided a process of treating activated carbon with a suitable oxidant having an oxidation potential higher than that of oxygen, where the activated carbon is for adsorbing gold and silver values from a solution of gold and silver.

BRIEF DESCRIPTION OF THE FIGURE

The FIGURE shows a schematic diagram of a process for the extraction and recovery of gold and silver according to the invention.

DETAILED DESCRIPTION OF PREFERRED EMBODIMENTS

The process of the invention is useful in the processing of ore containing gold and economically significant values of silver. Gold bearing ores containing at least 15 grams/tonne of silver are attractive for processing in accordance with the invention under present market conditions. In one aspect the inventive process is a modification of a conventional process often used in gold and silver milling operations. Descriptions of the conventional process, which is a cyanide leach, carbon-in-pulp process, are found in the literature, such as the aforementioned Canadian Patent Nos. 1,232,139 and 1,125,033. A description of the conventional process adapted for recovering gold and silver values from tailings from uranium production is found in the following publication: Rowson, J. W., Melis, L. A., "Operation of a gold extraction circuit for recovery of gold from uranium mill tailings at Cluff Lake, Saskatchewan", CIM Bulletin, Vol. 82, No. 931, pp. 40-46 (November, 1989). Since the invention was developed in the operation of the version of the above-referenced conventional process described in the latter publication, the following example of the inventive process is based on the conventional process described in such publication. Of course, the version of the inventive process as more particularly described hereinafter is merely exemplary; the inventive process can also be used for treating ore which has not been previously treated for recovery of uranium and with any cyanide leach/carbon-in-pulp process for recovery of gold and silver.

In the RECLAIM step of the FIGURE, gold and silver bearing tailings from a uranium mill were dumped and washed into a concrete sump to provide a leach tails slurry. The slurry was pumped to a scalping screen with the undersize reporting to a surge tank. Scalping screen oversize reported directly to the ball mill for the GRINDING stage. Neutralization of the acidic slurry was initiated in the surge tank by the addition of lime. The alkaline pulp was then pumped over an 840 micrometer (20 mesh) sieve-bend screen. The primary screen undersize was pumped to a 149 micrometer (100 mesh) vibrating screen for classification. The oversize from the classifying screen was discharged to a ball mill to provide a 65% minus 74 micrometer (200 mesh) grind.

The ground slurry was thickened to approximately 45% solids in the THICKENER stage. The thickener overflow was re-used as grinding water or reclaim pit water. Any excess was discharged. The thickener underflow was pumped to a NEUTRALIZATION tank where lime was added to increase the pulp alkalinity to 0.5 g/l available lime ahead of CYANIDATION. The pH of the pulp was thereby raised to about 11.5. For cyanidation, the pH preferably should be no lower than about 10.

The cyanidation circuit consisted of four tanks with an intermediate CARBON-IN-PULP STAGE between No. 2 and No. 3 cyanidation tanks. This additional CIP stage provided for gold removal from the high tenor leach solution which in turn enhanced gold leaching in the downstream leach tanks. The total retention time in the cyanidation circuit was 72 hours. Terminal cyanide concentrations were maintained at approximately 2 g. NaCN/L.

The CIP circuit consisted of the intermediate CIP tank in the cyanidation circuit and a subsequent series of five CIP tanks with one-hour retention time per tank. Carbon was retained in each tank by screens installed at the discharge of each tank. Carbon transfer upstream between tanks was accomplished with centrifugal pumps. Loaded carbon, 3.35 mm by 1.18 mm (6 by 16 mesh), from the second CIP tank was transferred to the intermediate CIP tank. Once fully loaded, the carbon was transferred from this tank to the 420 micrometer loaded carbon vibrating screen. The loaded carbon oversize was directed to the loaded carbon stripping vessels.

The CARBON STRIPPING cycle occurred over a period of 5 to 7 days using a caustic/cyanide stripping solution at a temperature of 90° C. to 95° C. Stripped carbon was returned to No. 6 CIP tank after resizing. A facility for acid washing the carbon could have been provided, but was not necessary in the tests conducted. Pregnant strip solution overflowed the stripping vessel to an ELECTROWINNING cell containing 8 steelwool cathodes. The gold-loaded steelwool was dissolved in HCl. The gold-bearing sludge, which collected in the bottom of the cell, and the steelwool acid residue were dried and refined with borax, niter and silica fluxes in a reverberatory furnace to produce high quality dore. The FIGURE also shows steps for the recycling of cyanide and removal of CIP tailings.

Potassium permanganate was added to the leach solution in different test amounts prior to the No. 1 cyanidation tank stage at A or the five CIP tank stages at B. A control was also run in which no permanganate was added. The following results were obtained from these tests:

TABLE I

Silver Recovery onto Carbon by Adsorption from Auro- and Silver Cyanide Complex Solution.

% RECOVERY*

| CARBON LOADING TOTAL PRECIOUS METAL (g/tonne) | Oxidation potential (mV) | | | | |
|---|---|---|---|---|---|
| | FEED SOLUTION | FEED SOLUTION WITH PERMANGANATE | | | |
| | no additive $\epsilon_H = 90$ | 0.05 g/l $\epsilon_H = 390$ | 0.5 g/l $\epsilon_H = 501$ | 3.0 g/l $\epsilon_H = 531$ | 6.0 g/l $\epsilon_H = 566$ |
| 2,000 | 65 | 95 | 97 | 98 | 99 |
| 9,000 | 20 | 45 | 50 | 52 | 53 |
| 15,000 | 10 | 22 | 26 | 29 | 30 |

*The feed solution pH = 11.0 and loading was at 20 degrees C. The composition was 2 g/l NaCN; 1 g/l NaOH and saturated with respect to oxygen; the gold assay = 20 mg/l and silver = 2.2 mg/l. Retention time was constant for all tests.

The above Table shows significant improvements in silver recovery at relatively low addition levels of permanganate. The amount of permanganate to be added for improved silver recovery from a given ore will typically be determined by the savings in silver compared to the cost of the permanganate or other oxidant. In the case of the material used for the above tests, a minimum addition should be employed since the silver assay in the feed solution is relatively low.

A potential user of the present invention who is skilled in the art of precious metal recovery can determine the optimum point in the process for the oxidant addition. This generally depends upon the nature of the gold and silver bearing material being processed. There is often an observed increase in the leaching efficiencies of precious metals when using strong oxidants during a leaching stage. Therefore there will exist, in the leaching process, an economic balance between the value of the extra oxidant reagent consumed versus the value of additional precious metal leached into solution. For example, if the value of oxidant consumed during leaching exceeds the value of the extra precious metals leached into solution then the preferred addition point for the oxidant should be after leaching just prior to the CIP stage. If these values are reversed, then the preferred oxidant addition point may be prior to or perhaps during the leaching stage.

In carrying out the present invention in respect of a particular ore, it will occur to a person skilled in the art when selecting a suitable oxidant from the large number of oxidants having an oxidation potential greater than that of oxygen, that any of such oxidants which are compatible with a CIP process can be used. In practise the selection may be limited since some readily available and cost effective oxidizing agents are not suitable for use in alkaline media often used in extraction steps preceding the CIP stage. Also, in view of variations in the chemical composition of ore from one ore body to another, testing of ore is indicated to refine selection of a suitable oxidant. Other factors such as availability, workers' and environmental safety, physical characteristics (e.g. solubility), unwanted chemical reactivity and rate of consumption in use may influence selection of a suitable oxidant. Potassium permanganate was used to demonstrate this invention only because it was the least expensive reagent available at the time of the invention that was suitable for use with a cyanide-leach, CIP process.

In the gold milling facility of the applicant, potassium permanganate was used as an oxidant for an extended test period. Table II below documents the degree of improvement obtained in the recovery of silver in the final bullion product. Silver recoveries improved 400 to 500% and were achieved at 9000 g/tonne of carbon total precious metal loading when 0.05 g/l of potassium permanganate was added to the process feed stream.

TABLE II

Silver Recovery Improvement in Production Plant Operation

| | Period of Operation | Plant Feed Ag/Au Ratio | Bullion Prod Ag/Au Ratio | % Ag Recovery (by prod.)* |
|---|---|---|---|---|
| No Addition | 6 months (continuous) | 0.33 | .03–.06 | 8–15% |
| Potassium Permanganate Addition | 3 months (continuous) | 0.35 | .12–.27 | 31–69% |

Although the invention has been described with reference to a specific series of tests and preferred process conditions, it should be understood by a person skilled in the art that such description is merely exemplary of the inventive process and that the scope of the invention is not to be considered to be restricted to the preferred process conditions accordingly.

What is claimed is:

1. A process for recovering gold and silver values from ore comprising treating the ore to provide a solution of gold and silver, adsorbing the gold and silver from the solution onto activated carbon treated with an oxidant having an oxidation potential higher than that of oxygen and recovering gold and silver values from the activated carbon.

2. The process of claim 1 wherein the solution of gold and silver is an alkaline gold and silver solution, and the oxidant is provided in the solution of gold and silver such as to be available for treatment of the activated carbon.

3. The process of claim 1 wherein the oxidant raises the oxidation potential of the solution to greater than about +200 mV measured relative to the standard hydrogen electrode.

4. The process of claim 1 wherein the oxidant is potassium permanganate.

5. The process of claim 4 wherein the potassium permanganate is provided in the solution of gold and silver in a range of about 0.01 to 6.0 grams per liter of the solution.

6. The process of claim 2 wherein the oxidant is added to the solution at a stage when it would react minimally with other constituents of the solution.

7. In a process of recovering gold and silver values from ore comprising:

(a) cyanidation of the ore to provide an alkaline, gold and silver cyanide complex solution;

(b) feeding the solution to activated carbon for adsorption of the gold and silver onto the activated carbon;

(c) recovering adsorbed gold and silver from the activated carbon;

the improvement comprising treating the activated carbon with an oxidant having an oxidation potential greater than that of oxygen to increase the yield of silver.

8. Treatment of activated carbon with an oxidant having an oxidation potential higher than that of oxygen, where the activated carbon is for adsorbing gold and silver values from a solution of gold and silver.

9. Gold or silver whenever prepared or produced by the process of claim 1 or 7.

* * * * *